(12) United States Patent
Barker (10) Patent No.: US 7,150,131 B2
(45) Date of Patent: Dec. 19, 2006

(54) UTILITY TRENCHING AND SIDEWALK SYSTEM

(75) Inventor: James E. Barker, Branson, MO (US)

(73) Assignee: EDE Holdings, Inc., Joplin, MO (US)

( * ) Notice: Subject to any disclaimer, the term of this patent is extended or adjusted under 35 U.S.C. 154(b) by 335 days.

(21) Appl. No.: 10/765,263

(22) Filed: Jan. 27, 2004

(65) Prior Publication Data
US 2004/0182021 A1 Sep. 23, 2004

Related U.S. Application Data

(63) Continuation-in-part of application No. 10/038,721, filed on Jan. 3, 2002, now Pat. No. 6,702,510.

(51) Int. Cl.
E04C 2/52 (2006.01)
(52) U.S. Cl. .................. 52/220.5; 52/381; 52/220.2; 52/220.8; 404/3
(58) Field of Classification Search ............ 52/380, 52/381, 220.1, 220.2, 220.3, 220.4, 220.7, 52/220.8, 220.5; 138/105, 108, 110; 404/2–5
See application file for complete search history.

(56) References Cited

U.S. PATENT DOCUMENTS

| 355,330 A | 1/1887 | Locke |
| 896,984 A | 8/1908 | Freeman |
| 1,582,557 A | 4/1926 | Swanton et al. |
| 2,445,197 A | 7/1948 | Wiesmann |
| 2,862,367 A | 12/1958 | Silverstein et al. |
| 3,420,017 A * | 1/1969 | Brugger et al. ............ 52/220.5 |
| 3,503,425 A | 3/1970 | Holm |
| 3,715,844 A | 2/1973 | Breading |
| 3,815,304 A | 6/1974 | Schille et al. |
| 3,858,614 A | 1/1975 | Moore et al. |
| 4,124,324 A | 11/1978 | Augis et al. |
| 4,313,383 A * | 2/1982 | Parazader ................. 104/124 |
| 4,324,009 A * | 4/1982 | Hornsby ..................... 4/492 |
| 4,324,078 A * | 4/1982 | Gray ......................... 174/48 |
| 5,123,776 A | 6/1992 | Lang et al. |
| 5,165,453 A * | 11/1992 | Walker, Jr. ................. 138/104 |
| 5,213,438 A * | 5/1993 | Barenwald .................... 404/2 |
| 5,267,367 A | 12/1993 | Wegmann, Jr. |
| 5,281,052 A * | 1/1994 | Beamer ..................... 405/119 |
| 5,326,190 A * | 7/1994 | Beamer ..................... 405/119 |
| 5,522,675 A | 6/1996 | Gunter |
| 5,538,361 A | 7/1996 | Beamer |
| 5,573,351 A | 11/1996 | Beamer |
| 5,613,339 A * | 3/1997 | Pollock ..................... 52/731.1 |
| 5,653,553 A | 8/1997 | Gunter |
| 5,810,513 A | 9/1998 | Beamer et al. |
| 6,128,872 A | 10/2000 | Marshall et al. |

(Continued)

Primary Examiner—Naoko Slack
Assistant Examiner—Chi Q. Nguyen
(74) Attorney, Agent, or Firm—Wood, Herron & Evans, LLP (57) ABSTRACT

A utility trenching and sidewalk system comprising modular utility sidewalk units which may be assembled together to form a cable trench. The modular units are formed from plastic composite material and include sidewalls, a bottom wall and covers which define a chamber for housing utility cables. A cavity formed in the sidewalls and bottom wall is filled with concrete through apertures in the sidewalls. The covers are removable from the module to provide access to the chamber. The module further includes a recess for receiving a paving material which serves as a sidewalk surface in the installed system.

20 Claims, 9 Drawing Sheets

U.S. PATENT DOCUMENTS

| | | | |
|---|---|---|---|
| 6,288,331 B1 * | 9/2001 | Wirthwein et al. | 174/48 |
| 6,508,037 B1 * | 1/2003 | Owen | 52/220.1 |
| 6,702,510 B1 | 3/2004 | Barker | |
| 6,768,050 B1 * | 7/2004 | Lockard | 174/28 |

* cited by examiner

UTILITY TRENCHING AND SIDEWALK SYSTEM

This application is a continuation-in-part of application Ser. No. 10/038,721, filed Jan. 3, 2002 now U.S. Pat. No. 6,702,510 the disclosure of which is fully incorporated herein by reference.

FIELD OF THE INVENTION

The present invention pertains to utility trenches for routing utility cables.

BACKGROUND OF THE INVENTION

Utility cables are often buried beneath the earth to hide the cables and to protect them from damage, especially in residential or business areas. Buried utility cables, however, suffer many drawbacks. For example, various utility providers (such as electric, telephone and television providers) often work independently and bury their respective cables in separate locations. Such non-uniform burying of cables may lead to confusion regarding utility company rights of way and creates the danger of cables being severed or damaged during excavation by homeowners, developers, or other utility providers. If the cables are severed or otherwise damaged, repair or replacement requires the costly and time-consuming process of digging up of the buried cables. Furthermore, cables which are buried in the earth must be manufactured with relatively expensive insulation to protect the cables against moisture, heat, and damage from rodents.

To address some of the problems associated with exposed, buried cables, cable trenching systems have been developed to enclose the buried cables in a conduit. Previous trenching systems have typically been made from precast sections of concrete and are thus very heavy and costly compared to other available structural materials. Some trenching systems have been designed to function additionally as sidewalk sections to take advantage of their concrete structure. These precast concrete systems are installed into excavated trenches where nonuniform footing makes them susceptible to poor fit at the joints, which in turn may lead to rocking or shifting of the sidewalk sections.

Many of the previous trenching systems are designed to have only a single compartment for accommodating cables. As such, these prior art systems are not designed to handle incompatible cables which should be kept separate, such as electric cables and telephone or television cables. These incompatible cables must be kept separate due to the high voltage carried by electric cables which may interfere with the telephone or television cables, or create a hazardous environment for telephone or television utility employees who must access the trenching system.

For at least these reasons, there is a need for an improved utility trenching system for routing and protecting incompatible utility cables within a single unitary structure which is relatively lightweight and inexpensive compared to prior cable trenching systems.

SUMMARY OF THE INVENTION

The present invention provides a utility cable trenching system that separates incompatible utility cables while also providing a stable sidewalk surface. The utility trenching and sidewalk system of the present invention comprises modular units formed from relatively lightweight plastic composite material. Each module has outer sidewalls, a bottom wall, and at least one removable cover, which together form a channel.

Advantageously, each module includes an inner sidewall for providing two interior compartments for separating incompatible cables. The modular units are fastened together in an excavated trench to form a continuous conduit in which the various cables may be laid, with incompatible cables located in separate compartments. The cables may be routed in and out of the compartments through ports in the modules at various locations along the assembled utility trench.

The assembled modules are configured to provide a recess that serves as a form for receiving a paving material to create a sidewalk surface. The paving material, for example, may be precast pavers or mixed concrete which is poured into the recess and cured in situ. Lifting hooks positioned at various locations on the paving material aid in removing the paving material so that the cable compartments may be accessed.

In accordance with one embodiment of the present invention, a method for installing a utility trenching and sidewalk system, includes the steps of excavating a trench, placing modular utility sidewalk units adjacent one another in the trench to form a substantially continuous conduit, fastening adjacent modules together, laying utility cable in the conduit, installing covers to the modules, and pouring concrete into a form created by the series of adjacent modules to form a sidewalk.

In another embodiment of the invention, a cavity is formed in the sidewalls and bottom wall of the module. The cavity may be filled with poured, wet concrete through apertures provided in the sidewalls. In this embodiment, the cavity serves as a concrete mold to create a durable utility trenching system after the concrete has cured. Advantageously, the lightweight modules may be easily transported to a construction site and arranged in an excavated trench prior to filling the cavities of adjacent modules with concrete. Because the concrete is poured into the modules in situ, the resulting utility trenching and sidewalk system provides uniform fit at joints and is less susceptible to rocking or shifting.

These and other features, advantages, and objectives of the invention will become more readily apparent to those skilled in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
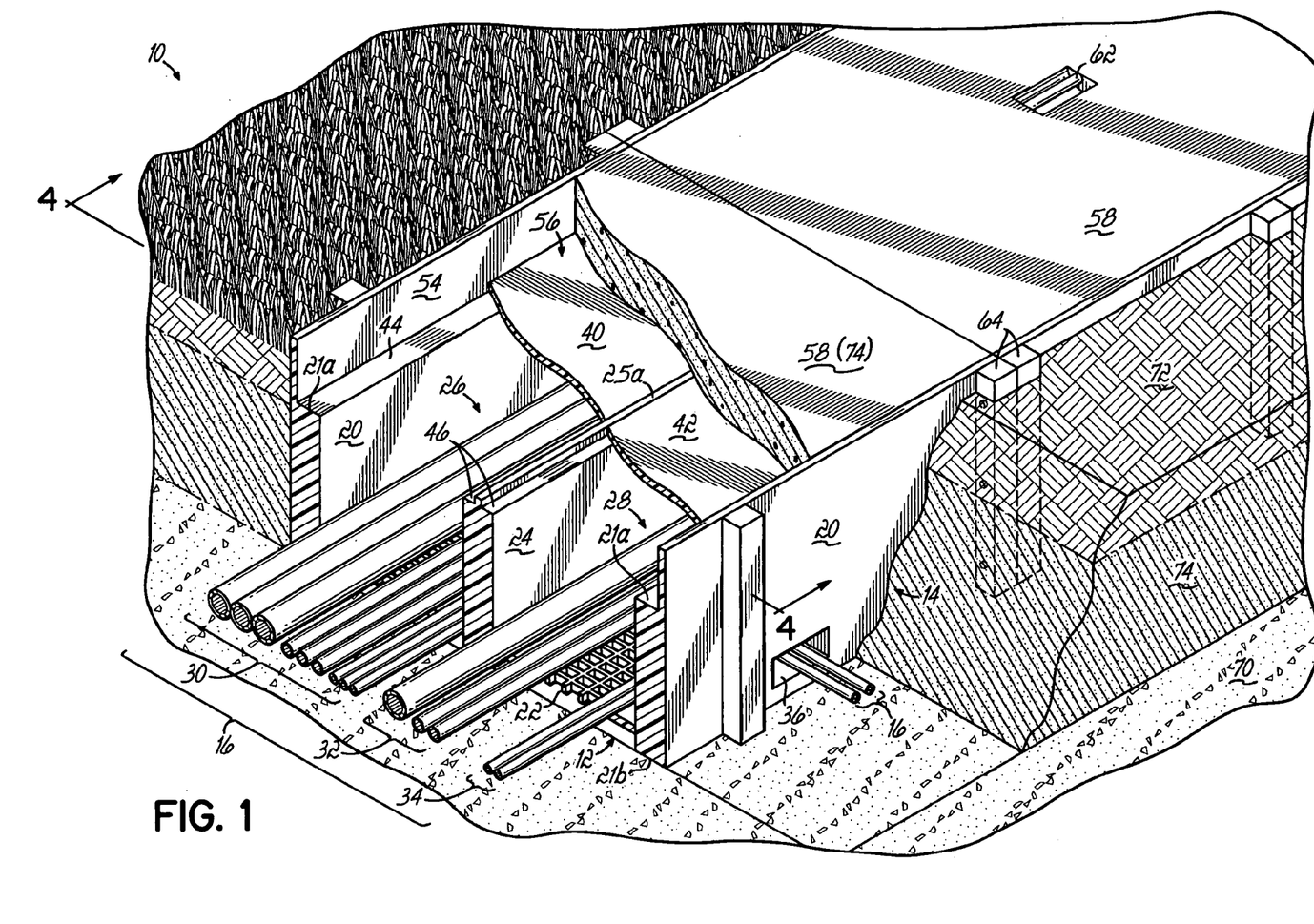
FIG. 1 is a perspective view of an exemplary utility trenching and sidewalk system of the present invention installed in a compacted earth environment.
Figure 2:
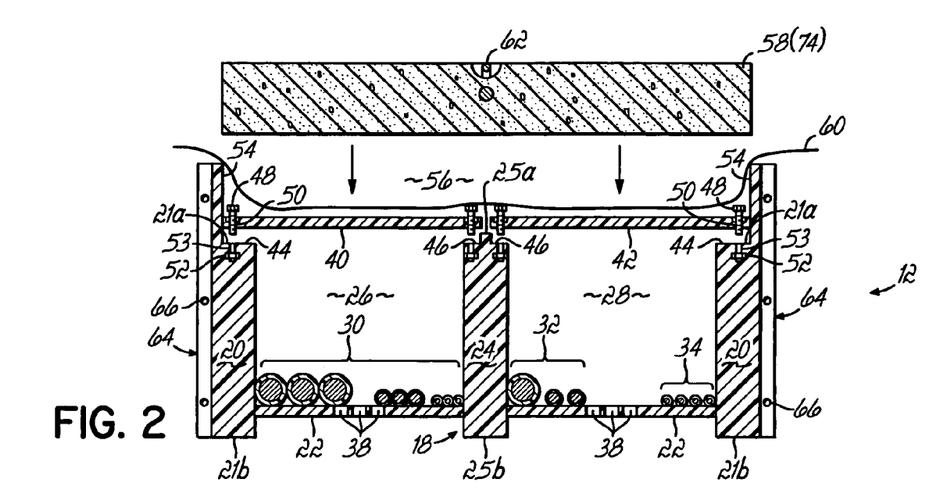
FIG. 2 is an exploded cross-sectional view of an exemplary utility trenching and sidewalk module of the present invention.

An exemplary utility trenching and sidewalk system 10 of the present invention is shown in FIGS. 1–5 in which like numerals are used to refer to like components. The trenching system 10 comprises a series of modular units 12 placed in an excavated trench 14 adjacent one another, longitudinally end to end, in an abutting relationship to form a continuous conduit for routing and protecting utility cables 16 laid within the conduit. Referring particularly to FIG. 2, the module 12 comprises a channel section 18 formed by opposing, and advantageously substantially parallel, outer sidewalls 20 and a bottom wall 22. Each outer sidewall has a top edge 21a and a bottom edge 21b, and the bottom wall 22 may be disposed proximate the bottom edges 21b. An inner sidewall 24 having a top edge 25a and a bottom edge 25b may be situated between the outer sidewalls 20, advantageously parallel thereto, with the bottom edge 25b proximate bottom wall 22. The inner sidewall 24 divides the channel 18 into two distinct compartments 26, 28. The channel 18 may thus be used to house utility cables 16 (30, 32, 34) from several providers, with incompatible cables located in individual compartments and separated by the inner side wall 24. For example, electrical power cables 30 may be located in the first compartment 26 and separated from other utility cables, such as telephone and television cables 32, 34, which may be located in the second compartment 28.

While the exemplary embodiments shown have two compartments 26, 28, the utility trenching system and sidewalk system 10 of the present invention may have more than two compartments, as may be required for a given application. Alternatively, the utility trenching and sidewalk system 10 of the present invention may have only a single compartment for housing cables, such as when there is no need to separate incompatible cables. Where a single compartment is desired, inner sidewall 24 may be eliminated and a single cover provided to enclose the compartment.

As more clearly shown in FIG. 1, the outer sidewalls 20 may be provided with ports 36 at various locations along the module 12 to permit the cables 16 to be routed into or out of the compartments 26, 28, as necessary, for connection to appropriate intermediate or end use systems. Drain holes 38 may be located in the bottom wall 22, to allow water or other liquids to pass through the bottom wall 22 and out of the compartments 26, 28.

Figure 4:
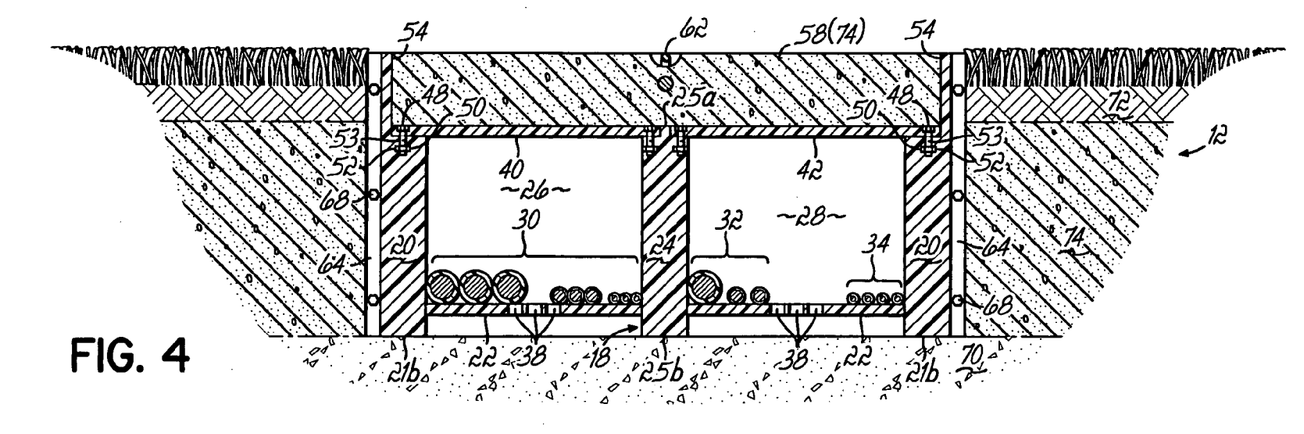
FIG. 4 is a cross-sectional view of the trenching and sidewalk system of FIG. 1, taken along line 4—4.
Figure 5:
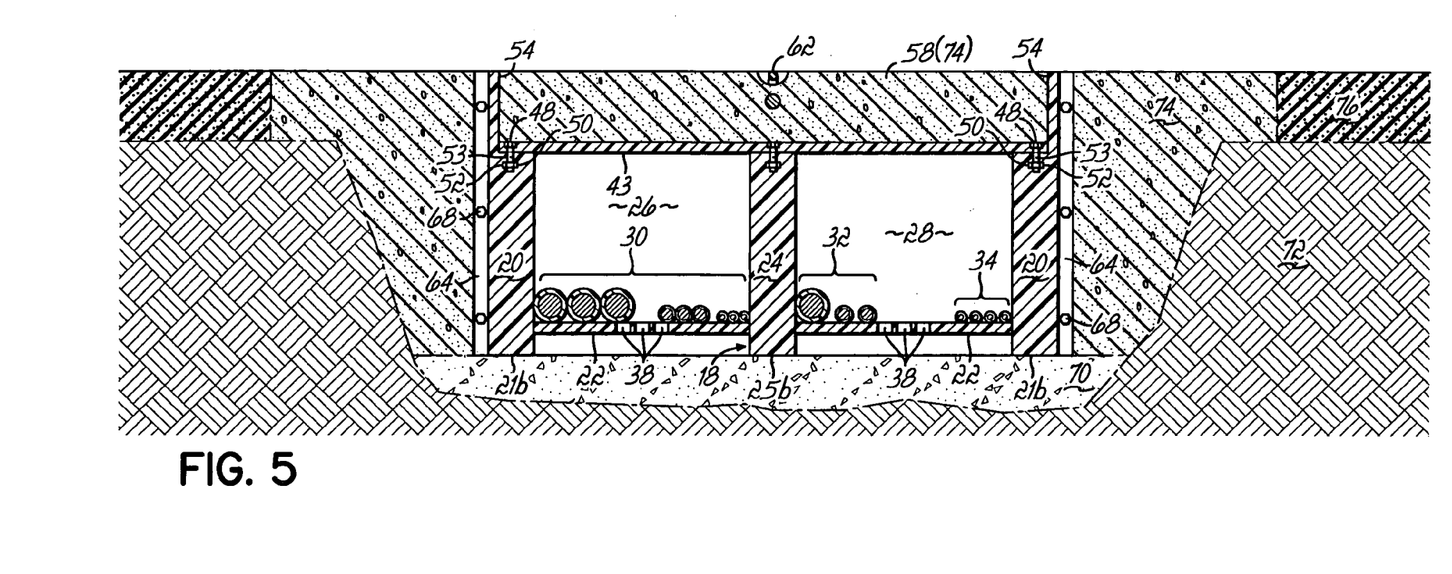
FIG. 5 is a cross-sectional view of an alternate embodiment of a utility trenching and sidewalk system of the present invention installed in an asphalt pavement environment.

The module 12 includes covers 40, 42 which may be fitted over the outer and inner sidewalls 20, 24 to enclose the cables 16 within the compartments 26, 28. In the exemplary embodiment shown in FIGS. 1–4, the module 12 includes two covers 40, 42, one for each respective compartment 26, 28 of the channel 18. In the alternative embodiment shown in FIG. 5, a single cover 43 is provided over channel 18. However, while the module 12 may be constructed with only a single cover 43, having separate covers 40, 42 is advantageous in that it permits utility providers to access their respective cables 16 without disturbing or otherwise being exposed to incompatible cables of another utility provider. This is particularly advantageous in protecting against electric shock from power cables 30. The top edge 21a and 25a of the outer and inner sidewalls 20, 24, respectively, have ledge portions 44, 46, respectively, which support the covers 40, 42. By way of example, the covers 40, 42 may be fastened to the ledge portions 44, 46 of the inner and outer sidewalls 20, 24 using bolts 48 installed through bolt holes 50 in the covers and received into threaded portions 52 of the inner and outer sidewalls 20, 24. Threaded portions 52 of the inner and outer sidewalls 20, 24 may be provided, for example, by self-centering, stainless steel nuts or threaded inserts installed into recesses 53 located in the ledge portions 44, 46 of the inner and outer sidewalls 20, 24. As shown in FIG. 5, ledge portions 46 need not be formed in top edge 25a on inner sidewall 24 when a single cover is used, and a single bolt 48 into sidewall 24 may be used to fasten the cover to it. Though not shown, it may be appreciated that inner sidewall 24 and bolt 48 may be eliminated if only a single compartment is desired. Likewise, more than two covers and more than one inner sidewall may be provided to create and enclose more than two compartments.

The top edges 21a of outer sidewalls 20 of the module 12 have a raised portion 54 along an outward portion of the top edge 21a of sidewall 20 which extends beyond the top surface of the covers 40, 42. The raised portions 54 of the outer sidewalls 20 define a recess 56 in the module 12, together with the covers 40, 42, which serves as a form for receiving a paving material 58, such as concrete or brick, which can be used as a sidewalk. The paving material 58 may be precast and placed within the recess 56 after the modules 12 have been assembled together, as shown in FIG. 2, or the paving material 58 may be molded in situ directly in the recess 56. For example, concrete may be poured directly into the recess 56 and cured in situ to create a concrete sidewalk. As shown in FIG. 2, a flexible barrier material 60, such as plastic sheeting, may be placed in the recess 56 prior to pouring paving material 58, such as concrete, into the recess 56 to form the sidewalk. The barrier material 60 allows the paving material 58 to cure without bonding to the modular unit 12 so that the hardened paving material 58 may be more easily removed from the recess 56 when access to the interior compartments 26, 28 is required.

In the exemplary embodiment shown, the paving material 58 advantageously includes lifting hooks 62 fixed to the paving material 58 to facilitate lifting the paving material 58 from the modular unit 12 so that the covers 40, 42 may be removed to access the individual compartments 26, 28 which house the cables 16. The lifting hooks 62 may be cast into a precast paver to be placed on the modular unit 12, or they may be embedded into the paving material 58 after it has been poured into the recess 56 formed by the sidewalls 20 and covers 40, 42 as described above.

Figure 3:
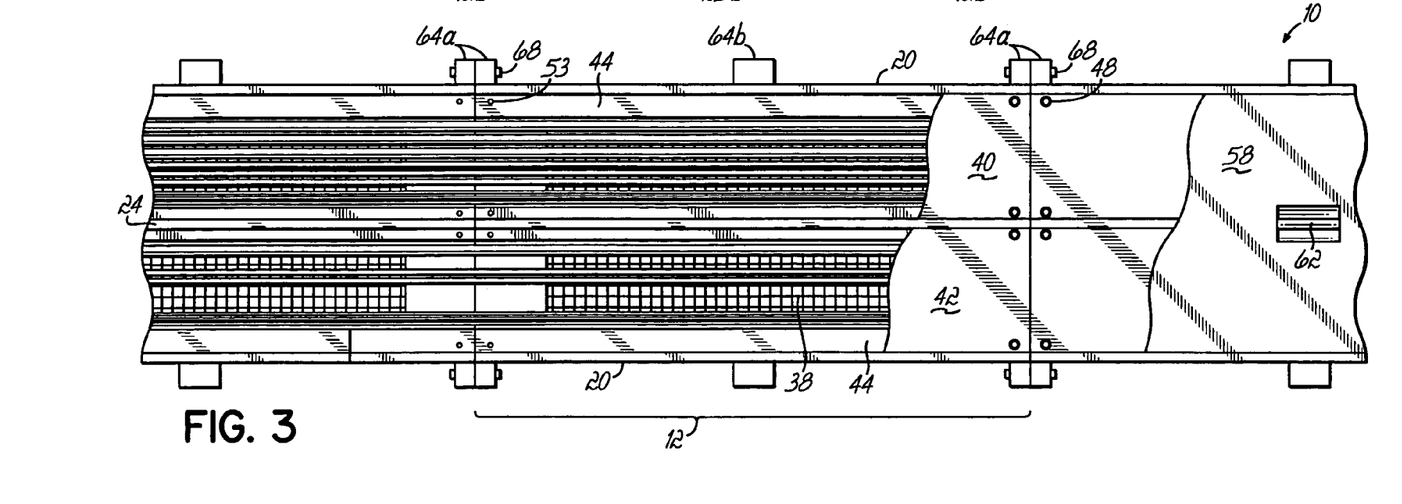
FIG. 3 is a partial plan view of the utility trenching and sidewalk system of FIG. 2.

The modular units 12 may further include side braces 64 positioned at various locations along the outer sidewalls 20. In the exemplary embodiment shown, some of the side braces 64a, as shown in FIG. 3, are located at end portions of a module 12 and have holes 66, as seen in FIGS. 2, 4 and 5, through which adjacent modules 12 may be fastened together with bolts 68. When the modules 12 are bolted together in such a fashion and concrete is poured into the recess 56 formed by the outer sidewalls 20 and covers 40, 42, the resulting trenching and sidewalk system 10 provides a uniform sidewalk with perfectly fitted sidewalk sections which do not shift or rock. Other side braces 64b may be positioned intermediate the ends of a module 12 to support the structure.

While concrete or other paving material 58 is used to create a sidewalk surface, the modular unit 12 itself is advantageously formed from a polymeric composite material. The module 12 may be formed by molding, casting, extruding, or other suitable manufacturing methods. The resulting module 12 is a lightweight structure which can be easily transported, maneuvered, and assembled into a utility trenching and sidewalk system 10 by an individual. The lightweight nature of the modular units 12 of the present invention thus offers a distinct advantage over the heavy precast concrete structures previously used.

A utility trenching and sidewalk system 10 according to the present invention may be installed in a variety of environments to provide an effective cable trenching system integral with a sidewalk. A typical installation in a compacted earth environment is shown in FIGS. 1 and 4. An alternative installation in an asphalt pavement environment is depicted in FIG. 5. Referring to these figures and FIG. 3, a method for installing a utility trenching and sidewalk system 10 according to the present invention will be described. To form the utility trench, several modules 12 are laid longitudinally end to end in a trench 14 which has been excavated in a desired location and lined with an appropriate base material, such as gravel 70. Adjacent modules 12 are bolted together at abutting side braces 64a to create a utility trench, as depicted in FIG. 3. Cables 16 of various utility providers, such as electric cables 30, telephone cables 32, and television cables 34, may then be laid within appropriate compartments 26, 28 of the series of modules 12.

Once the cables 16 have been laid, the module covers 40, 42 may then be installed and bolted in place with bolts 48. The excavated trench 14 may then be backfilled with earth 72, concrete 74, asphalt 76, or other appropriate material, as shown in FIGS. 4 and 5. Paving material 58 may be poured into the form created by the recess 56 in the modules 12. To make removal of the paving material 58 easier, a flexible barrier 60 and expansion-joint spacers (not shown) may be placed in the recess 56 prior to filling the recess 56 with paving material 58. Lifting hooks 62 may be placed in the uncured paving material 58 to further aid in the removal of paving material 58 when access to the compartments 26, 28 is desired. Alternatively, precast pavers may be placed into the recess 56 to form the sidewalk surface. The precast pavers may be provided with cast-in lifting hooks 62 to facilitate raising the pavers for access to the compartments 26, 28.

Figure 6:
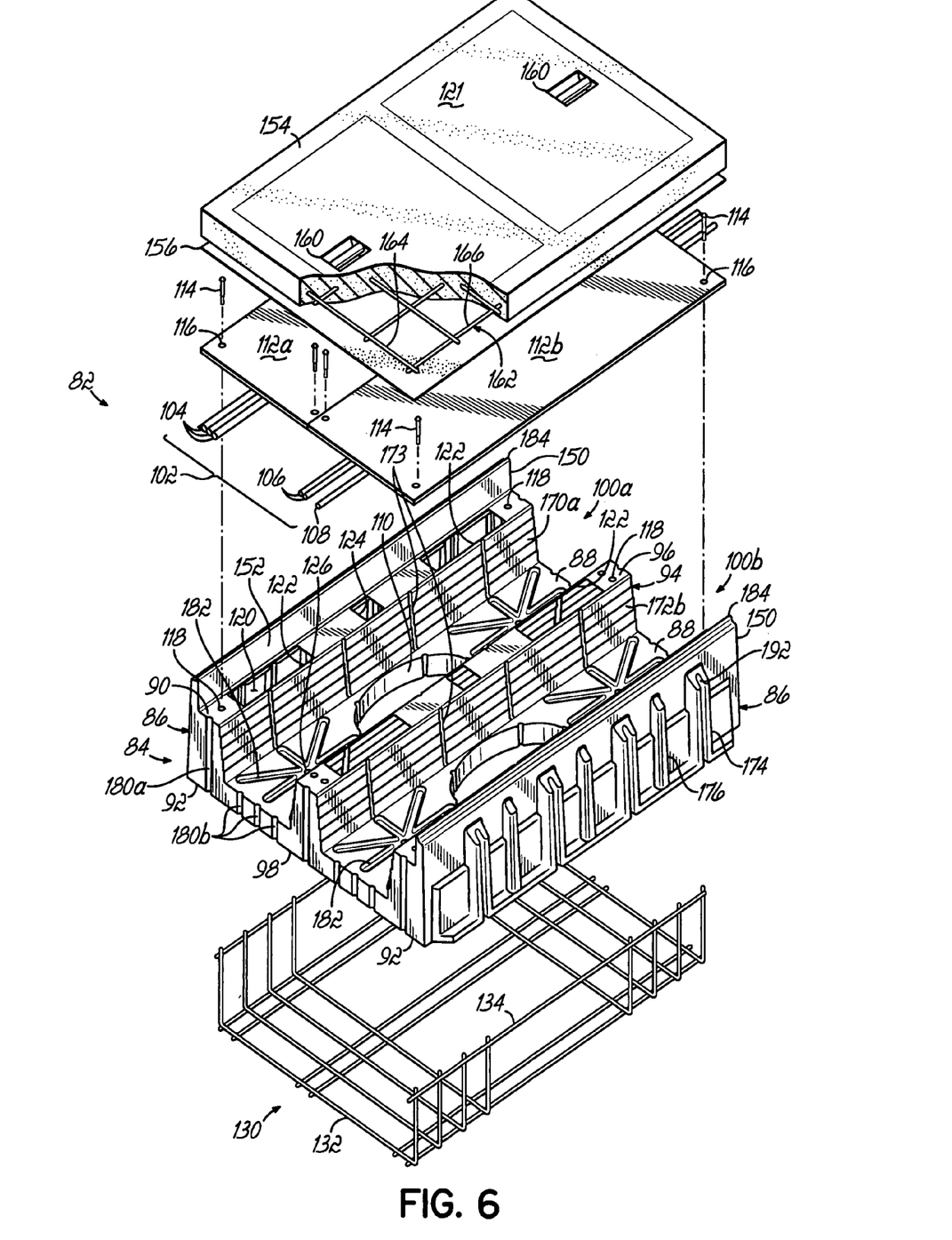
FIG. 6 is an exploded perspective view of another utility trenching and sidewalk module of the present invention.
Figure 6A:
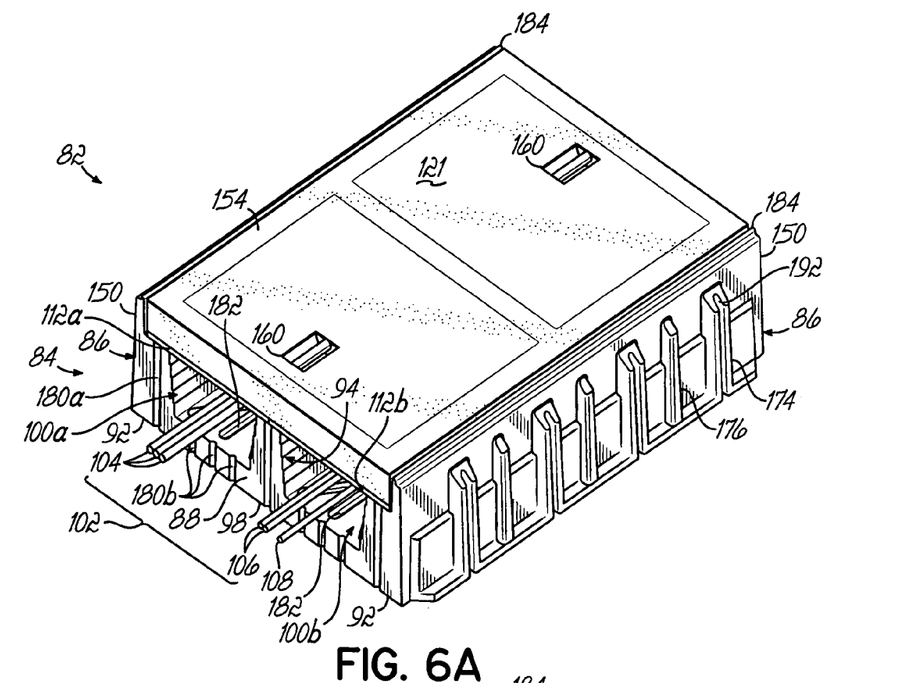
FIG. 6A is an assembled view of the module of FIG. 6.

Referring now to FIGS. 6–12, there is shown another exemplary embodiment of a modular utility trenching and sidewalk system 80 according to the present invention. FIGS. 6 and 6A depict a singular modular utility trenching and sidewalk unit 82 of this embodiment, similar to the modular unit 12 of FIGS. 1–5. The modular unit 82 comprises a channel section or base 84 formed by opposing, substantially parallel outer sidewalls 86 and a bottom wall 88. The outer sidewalls 86 have top ends 90 and bottom ends 92, and the bottom wall 88 is disposed proximate the bottom ends 92 of the outer sidewalls 86. In the embodiment shown, the channel section 84 further includes an inner sidewall 94 situated between the outer sidewalls 86. The inner sidewall has a top end 96 and a bottom end 98, with the bottom end 98 proximate the bottom wall 88.

Figure 8:
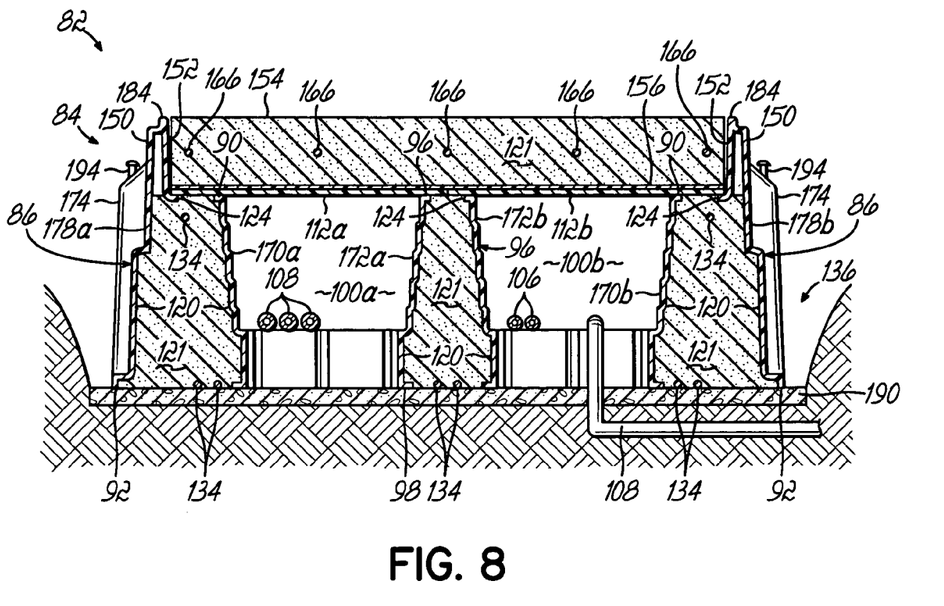
FIG. 8 is a cross-sectional view of the utility trenching and sidewalk system of FIG. 7, taken along line 8—8.

The inner sidewall 94 divides the channel or base 84 into two distinct compartments 100a, 100b. Accordingly, the channel section 84 may be used to house utility cables 102 from several providers whereby incompatible cables may be located in the individual compartments 100a, 100b and separated by the inner sidewall 94 as described above. Alternatively, the modular unit 82 may have more than two compartments, or only a single compartment for housing cables 102, as may be required for various applications and discussed above with respect to FIGS. 1–5. Ports 110 formed through the bottom wall 88, in each interior compartment 100a, 100b, permit cables 102 to be routed into and out of the compartments 100a, 100b, as best depicted in FIG. 8. The ports 110 may also be useful for facilitating the drainage of liquids from the interior compartments 100a, 100b.

The modular unit 82 further includes covers 112a, 112b which may be fitted over the outer and inner sidewalls 86, 94 to enclose the cables 102 within the compartments 100a, 100b. In the embodiment shown, the modular unit 82 includes two covers 112a, 112b, one for each respective compartment 100a, 100b of the channel. Alternatively, the modular unit 82 may be provided with only a single cover, as discussed above. While the exemplary embodiments shown and described herein depict the covers 112a, 112b as structural members which support paving material above the channel section 84, it will be recognized that the channel compartments 100a, 100b may alternatively be covered by a pre-cast paving member (not shown) placed directly on the outer and inner sidewalls 86, 94.

The top ends 90, 96 of the outer and inner sidewalls 86, 94 are configured to receive the covers 112a, 112b thereon, and the covers 112a, 112b may be fastened to the outer and inner sidewalls 86, 94, for example, using bolts 114 installed through bolt holes 116 in the covers 112a, 112b and received into threaded portions 118 of the outer and inner sidewalls 86, 94. The threaded portions 118 of the outer and inner sidewalls 86, 94 may be provided, for example, by self centering, stainless steel nuts or threaded inserts installed into recesses or apertures formed at corresponding locations on the top ends 90, 96 of the outer and inner sidewalls 86, 94.

Figure 9:
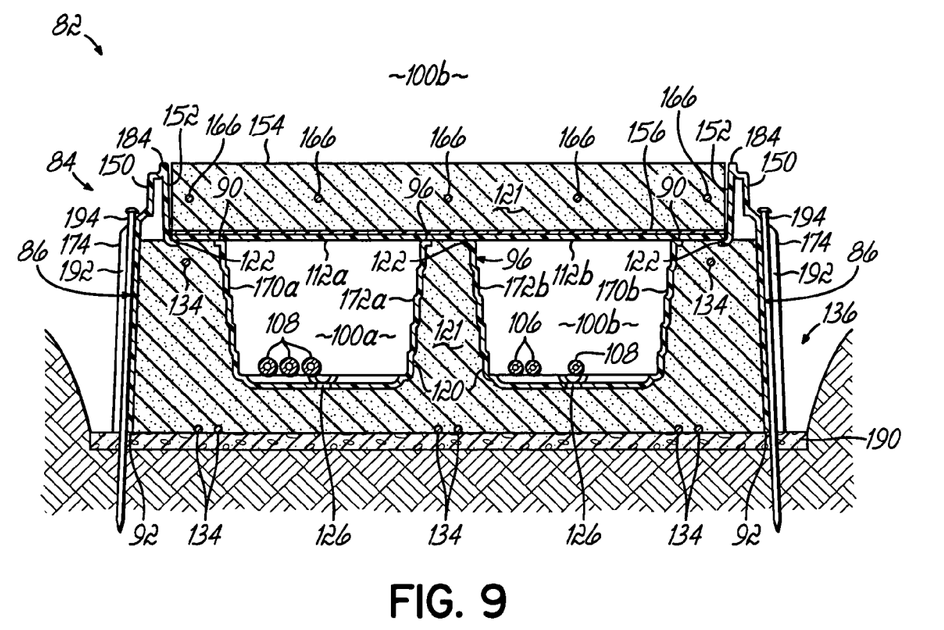
FIG. 9 is a cross-sectional view of the utility trenching and sidewalk system of FIG. 7, taken along line 9—9.

Referring now to FIGS. 6, 8 and 9, the modular unit 82 further includes at least one cavity 120 formed in the outer and inner sidewalls 86, 94 and the bottom wall 88. Apertures 122 formed through the sidewalls 86, 94, advantageously at the top ends 90, 96 of the sidewalls 86, 94, are in communication with the cavity 120 and are sized to receive poured wet concrete 121 whereby the cavity 120 may be filled with concrete 121 through the apertures 122. Accordingly, the cavity 120 acts as a concrete mold, and the sidewalls 86, 94 and bottom wall 88 retain the shape of the poured wet concrete 121 as it cures to create a durable utility trenching and sidewalk system 80. As concrete 121 fills the cavity 120, the apertures 124 in the sidewalls 86, 94 and additional apertures 126 formed through the bottom wall 88 and communicating with the cavity 120 help to vent air from within the cavity 120.

Figure 6B:
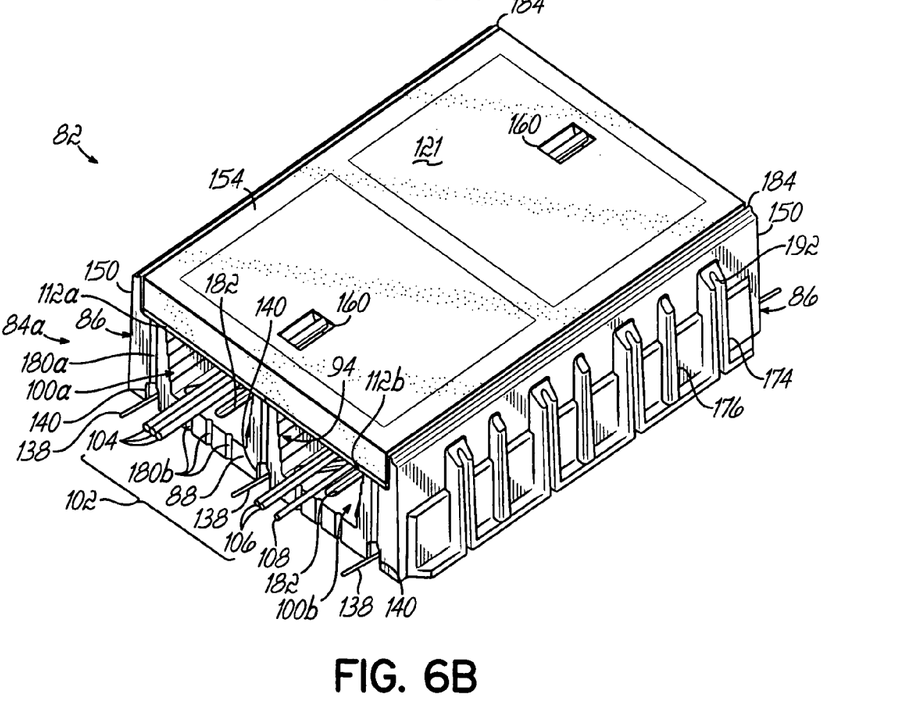
FIG. 6B is a perspective view of another utility trenching and sidewalk module of the present invention.

The modular unit 82 may also be provided with reinforcing members which become embedded in the poured concrete 121 to strengthen the cured concrete 121. In the exemplary embodiment shown, a first reinforcing member 130, in the form of a first rebar cage, is configured to be received within the cavity 120 of the channel section 84. The first reinforcing member 130 is formed from rebar rods 132, 134 which have been connected and shaped to extend within the interior portions of the outer and inner sidewalls 86, 94 and bottom wall 88. Advantageously, the first reinforcing member 130 may be laid in a trench 136 (see FIGS. 8 and 9) which has been prepared for the utility trenching and sidewalk system 80, whereafter the channel section 84 may be placed over the first reinforcing member 130 prior to filling the channel section 84 with wet concrete 121. Alternatively, the first reinforcing member 130 or rebar cage may be secured to the channel section 84, within the cavity 120, so that the first reinforcing member 130 is appropriately located when the channel section 84 is arranged in the trench 136. While FIG. 6 depicts a first reinforcing member 130 in the form of a rebar cage, another embodiment of channel section 84a may be used with conventional rebar 138 laid in the trench 136 for the sidewalk system 80, as depicted in FIG. 6B. In this embodiment, apertures 140 formed in the longitudinal ends of the channel section 84a facilitate placing the channel section 84a over the rebar 138 during installation.

The top ends 90 of the outer sidewalls 86 have raised portions 150 extending along outward facing edges of the outer sidewalls 86 and beyond the top surfaces of the covers 112a, 112b. The raised portions 150 of the outer sidewalls 86 define a recess 152 in the modular unit 82 which, together with the covers 112a, 112b, create a form for receiving paving material 154, such as concrete 121, asphalt, brick or other material, above the covers 112a, 112b. The paving material 154 may be pre-cast and placed within the recess after the modules have been assembled together, or the paving material may be molded directly within the recess 152, as described above with respect to FIGS. 1–5. To facilitate removal of the paving material 154 after it has been formed in the recess 152, the raised portions 150 and top surfaces of the covers 112a, 112b may be coated with a release material. Alternatively, a flexible barrier material 156, such as plastic sheeting, may be placed in the recess 152 prior to pouring the paving material 154 to form the sidewalk.

As shown in FIG. 6, the paving material 154 may include lifting hooks 160 to facilitate lifting the paving material 154 from the modular unit 82 so that the covers 112a, 112b may be removed to permit access to the individual compartments 100a, 100b which house the cables 102. The lifting hooks 160 may be cast into a pre-cast paver to be placed in the modular unit, or they may be embedded into the paving material 154 after it has been poured into the recess 152 defined by the outer sidewalls 86 and covers 112a, 112b, as described above.

In another embodiment, the modular unit 82 further comprises a second reinforcing member 162 configured to be received within the recess 152, prior to filling the recess 152 with paving material 154 such as concrete 121, to thereby reinforce the cured concrete 121 in a manner similar to that described above for the first reinforcing member 130. In the embodiment shown, the second reinforcing member 162 comprises a second cage formed from rebar 164, 166.

In yet another embodiment, the channel section 84 is formed as a molded shell wherein the outer and inner sidewalls 86, 94 and bottom wall 88 are molded as an integral unit. In this embodiment, the channel section 84 may be formed from plastic material such as polyethylene, polyvinylchloride, or any other material suitable for molding the channel section 84. Because the channel section 84 acts as a mold for receiving poured wet concrete 121, the wall thickness of the sidewalls 86, 94 and bottom wall 88 which define the cavity 120 for receiving concrete 121 need only be thick enough to hold the forces of the wet concrete 121 as it cures. In this embodiment, the channel section 84 comprises a six foot long unit formed by rotational molding and the wall thickness is approximately 0.15 to 0.2 inches.

To facilitate molding and to provide structural rigidity to the sidewalls 86, 94 and bottom wall 88, inwardly facing side surfaces 170a, 170b of the outer sidewalls 86 and the side surfaces 172a, 172b of the inner sidewall 94 may be tapered in step-wise fashion and vertically oriented grooves 173 may be formed into the sidewalls 86, 94, as best shown in the FIGS. 6, 8 and 9. To further add structural rigidity, outwardly extending ribs 174, 176 may be provided along the outward facing side surfaces 178a, 178b of the outer sidewalls 86 and grooves 180a, 180b may be formed into the longitudinal ends of the sidewalls 86, 94 and bottom wall 88. To provide strength to the bottom wall 88, embossed patterns 182 may be formed in the bottom wall 88 between the ports 110 and the longitudinal ends of the channel section 84. Raised lips 184 may be formed along the top edge of the raised portions 150 of the outer sidewalls 84 (see FIGS. 8 and 9) to facilitate molding the channel section 84 and to add strength to the raised portions 150.

The covers 112a, 112b may also be formed from plastic material such as polyethylene, polyvinylchhloride or any suitable polymeric material. Advantageously, the covers 112a, 112b and/or channel section 84 may be formed from material having recycled material content.

Figure 7:
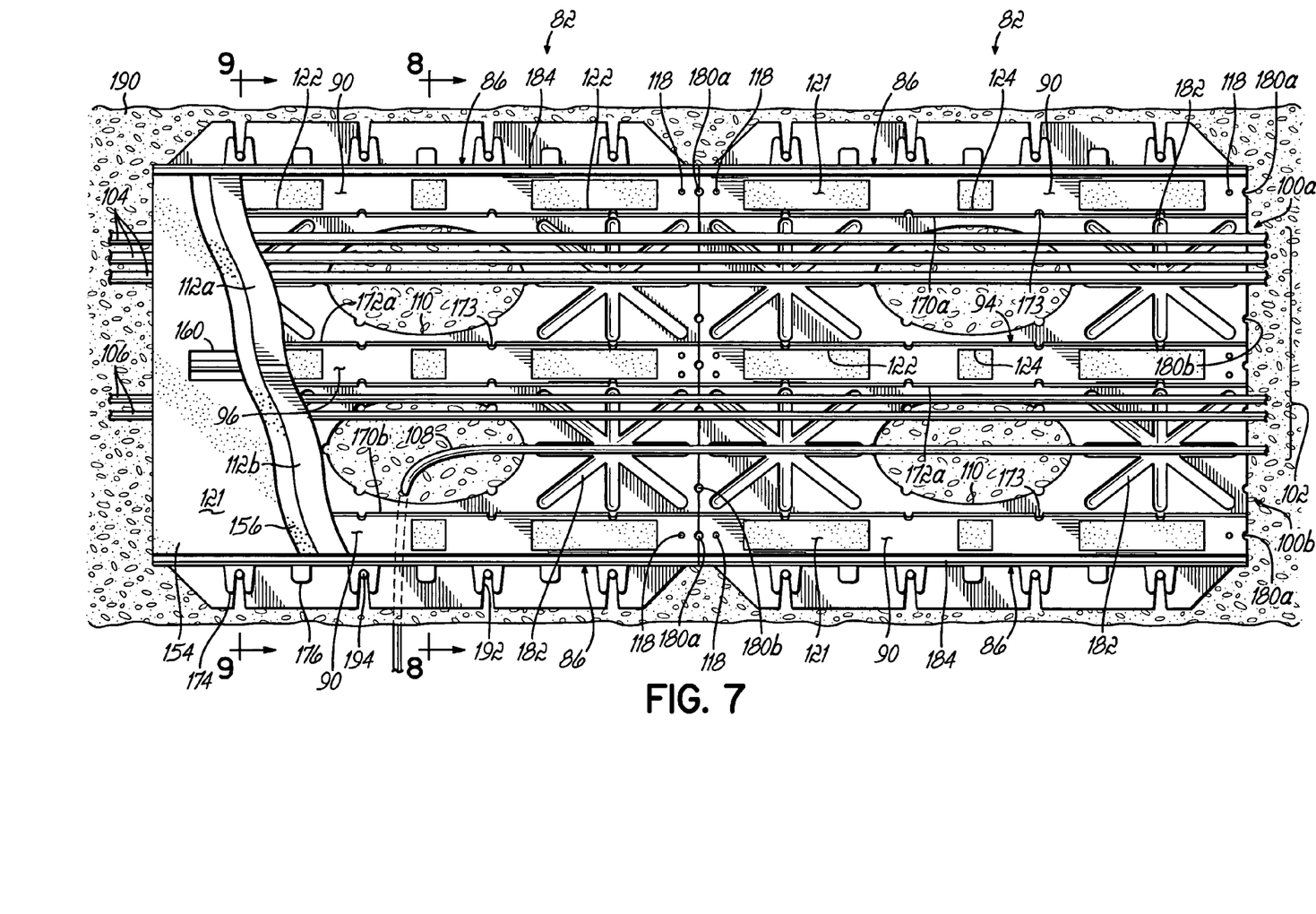
FIG. 7 is a plan view of a utility trenching and sidewalk system formed with the module of FIG. 6.

FIGS. 7–9 depict modular units 82 of FIG. 6 assembled to form the utility trenching and sidewalk system 80. The utility trenching and sidewalk system 80 may be installed, as described above, wherein a plurality of modular units 82 are arranged adjacent to one another, longitudinally end to end, to form a substantially continuous conduit in which the utility cables 102 may be laid. The modules 82 are laid in a trench 136 which has been excavated in a desired location and lined with an appropriate base material 190, such as gravel. Advantageously, some of the ribs 174 provided on the outer side surfaces 178a, 178b of the outer sidewalls 84 have vertically extending grooves 192 configured to receive stakes 194 which may be driven into the ground to securely position the modular units 82 within the trench 136.

The modular units 82 may be provided with first reinforcing members 130, as described above, wherein the first reinforcing members 130 are secured within the interior cavity 120 and thereby appropriately positioned within the trench 136 when the channel sections 84 are arranged end to end. Alternatively, the first reinforcing members 130 may be laid in the trench 136 on the base material 190, whereafter the channel sections 84 are placed over the first reinforcing members 130 and staked in position to define the conduit. After the channel sections 84 have been properly arranged, the interior cavities 120 are filled with wet concrete 121 through the apertures 122 provided in the top ends 90, 96 of the sidewalls 86, 94. Cables 102 of various utility providers, such as electric cables 104, telephone cables 106, and television cables 108 may then be laid within the appropriate compartments 100a, 100b of the modules 82 and routed into and out of the compartments 100a, 100b through the ports 110 formed in the bottom walls 88, as may be desired.

Once the cables 102 have been laid, the module covers 112a, 112b may then be installed and secured with bolts 114. Paving material 154 may then be poured into the form created by the recesses 152 defined by the top covers 112a, 112b and outer sidewalls 86 of the modules 82. To make removal of the paving material 154 easier, a flexible barrier material 156 and expansion joint spacers (not shown) may be placed in the recess 150 prior to filling the recess 150 with paving material 154. Lifting hooks 160 may be placed in the uncured paving material 154 to further aid the removal of the paving material 154 when access to the compartments 100a, 100b is desired. Alternatively, pre-cast pavers may be placed in the recesses 150 to form the sidewalk surface. The excavated trench 136 may then be backfilled with earth, concrete, asphalt, or other appropriate material, as described above.

While the method of forming a utility trenching and sidewalk system 80 has been described above wherein the utility cables 102 are laid in the appropriate compartments 100a, 100b of the modules 82 prior to placing the covers 112a, 112b on the modules 82 and forming the sidewalk surface, it will be recognized that the cables 102 may alternatively be laid after the sidewalk surface has been formed, by removing the paving material 154 and covers 112a, 112b.

Figure 10A:
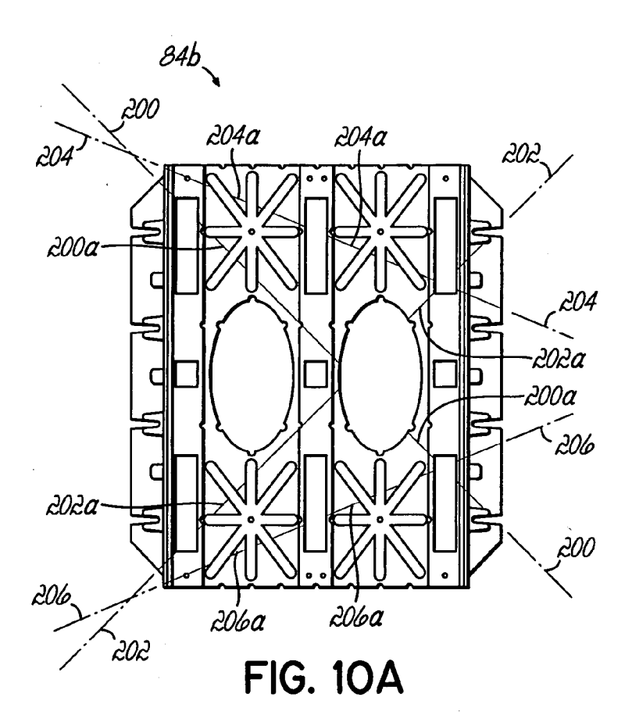
FIG. 10A is a plan view of a channel section of the module of FIG. 6, depicting lines for dividing the channel section.
Figure 10B:
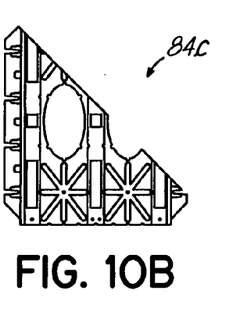
FIGS. 10B–10F are plan views depicting fractional pieces of the channel section of FIG. 10A, formed by dividing the channel sections along the lines shown in FIG. 10A.
Figure 10C:
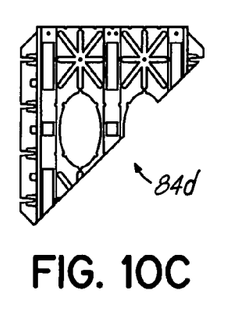
Figure 10D:
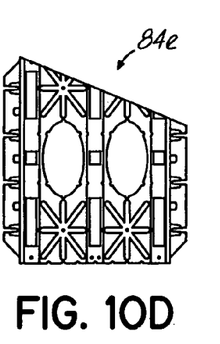
Figure 10E:
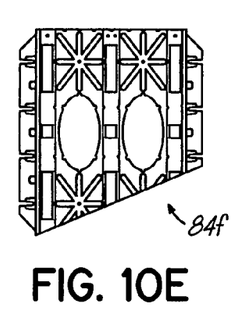
Figure 10F:
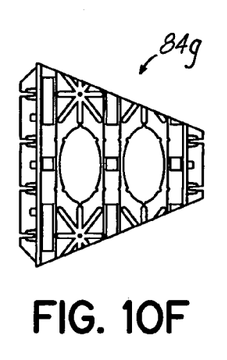
Figure 11:
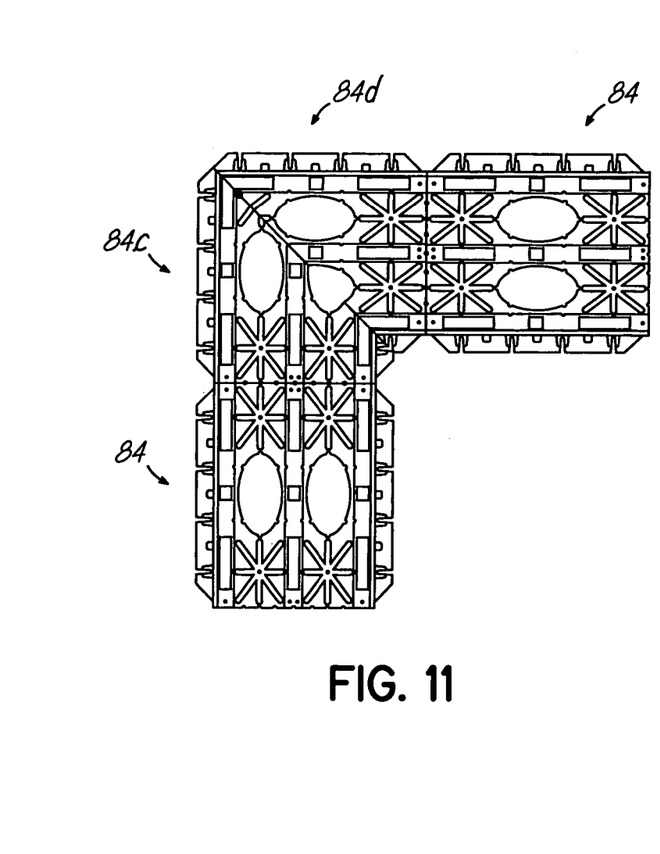
FIG. 11 is a plan view depicting a plurality of channel sections of the present invention arranged to form a sharp corner.
Figure 12:
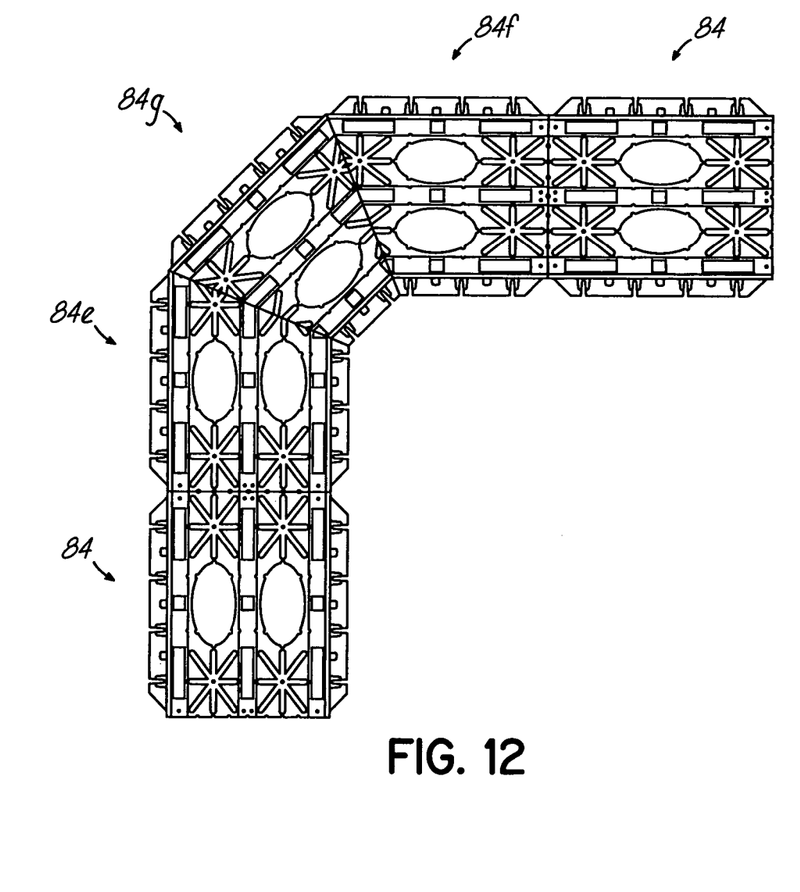
FIG. 12 is a plan view, similar to FIG. 11, depicting channel sections arranged to form a curve.

In another embodiment, the channel section 84 and covers 112a, 112b of the modular unit 82 may be divided into fractional pieces, such as by sawing or cutting, and arranged in an excavated trench 136, to conform the utility trenching and sidewalk system 80 to a desired configuration. For example, the channel section 84b may be divided along lines 200, 202, 204, 206 extending across the channel section 84b between the outer sidewalls 86, as depicted in FIG. 10A, to obtain fractional pieces 84c–84g, depicted in FIGS. 10B–10F. Advantageously, the fractional pieces 84c–84g may be used in conjunction with adjacent modular units 82 to facilitate changing the direction of the conduit when it is desired to form a corner with the utility trenching and sidewalk system 80, as depicted in FIGS. 11 and 12. To facilitate dividing the channel section 84b into fractional pieces 84c–84g, the channel section 84b may be provided with one or more reference lines 200a, 202a, 204a, 206a formed across the channel section 84b and between the outer sidewalls 86, as depicted in FIG. 10A.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A module for a utility trenching and sidewalk system, comprising:
    two opposed outer sidewalls, each outer sidewall having a top end and a bottom end;
    a bottom wall disposed proximate said bottom ends of said outer sidewalls and together with said outer sidewalls defining a channel having at least one interior compartment;
    at least one cover configured to be removably received proximate said top ends of said outer sidewalls to enclose said channel;
    at least one cavity formed in said sidewalls and said bottom wall for receiving wet, poured concrete; and
    at least one aperture formed through said sidewalls and communicating with said cavity, said aperture sized to receive poured, wet concrete therethrough to fill said cavity.

2. The module of claim 1, wherein said cover and outer sidewalls define a recess above said cover for receiving paving material.

3. The module of claim 1, wherein said cover is formed from paving material.

4. The module of claim 1, further comprising vent holes formed through at least one of said bottom wall and said sidewalls and communicating with said cavity to vent air from said cavity while said cavity is filled with concrete.

5. The module of claim 1, further comprising at least one inner sidewall having a top end and a bottom end, said inner sidewall disposed between said outer sidewalls to thereby form at least two interior compartments.

6. The module of claim 5, further comprising at least two covers, each cover configured to be removably received proximate said top ends of said inner sidewall and one of said outer sidewalls to thereby enclose a respective one of said interior compartments.

7. The module of claim 1 formed as an integrally molded shell, said molded shell defining said outer sidewalls, said bottom wall, and said inner sidewall.

8. The module of claim 7, wherein said molded shell is formed from polyethylene.

9. The module of claim 1, further comprising a plurality of reinforcing ribs disposed along outwardly facing side surfaces of said outer sidewalls.

10. The module of claim 1, further comprising at least one reference line disposed across the module between said outer sidewalls and oriented to facilitate subdividing the module into fractional pieces.

11. A kit for forming a utility trenching and sidewalk system, comprising:
    a modular base, including:
        two opposed outer sidewalls, each outer sidewall having a top end and a bottom end,
        a bottom wall disposed proximate said bottom ends of said outer sidewalls and together with said outer sidewalls defining a channel having at least one interior compartment,
        at least one cavity formed in said sidewalls and said bottom wall for receiving poured, wet concrete, and
        at least one aperture formed through said sidewalls and communicating with said cavity, said aperture sized to receive poured wet concrete therethrough to fill said cavity;
    at least one cover configured to be removably received proximate said top ends of said outer sidewalls of said modular base to enclose said channel; and
    a first reinforcing member configured to be received within said cavity to reinforce concrete thereafter provided within said cavity.

12. The kit of claim 11, wherein said first reinforcing member is configured to be secured within said cavity.

13. The kit of claim 11, wherein said cover and outer sidewalls define a recess above said cover for receiving paving material, the kit further comprising a second reinforcing member configured to be received in said recess to reinforce concrete thereafter provided within said recess.

14. A utility trenching and sidewalk system, comprising:
a plurality of modular utility trenching and sidewalk units arranged adjacent one another longitudinally end-to-end to form a substantially continuous conduit, each modular unit comprising:
  two opposed outer sidewalls, each outer sidewall having a top end and a bottom end;
  a bottom wall disposed proximate said bottom ends of said outer sidewalls and together with said outer sidewalks defining a channel having at least one interior compartment;
  at least one cover configured to be removably received proximate said top ends of said outer sidewalks to enclose said channel;
  at least one cavity formed in said sidewalls and said bottom wall for receiving wet, poured concrete; and
  at least one aperture formed through said sidewalks and communicating with said cavity, said aperture sized to receive poured wet concrete therethrough to fill said cavity.

15. The utility trenching and sidewalk system of claim 14, further comprising at least one first reinforcing member configured to be received within at least one of said cavities of said modular units.

16. The utility trenching and sidewalk system of claim 14, wherein said cover and said outer sidewalls of each said modular unit define a recess above said cover for receiving paving material, the utility trenching and sidewalk system further comprising at least one second reinforcing member configured to be received in at least one of said recesses.

17. The utility trenching and sidewalk system of claim 14, wherein at least one of said modular units is divided into fractional pieces and aligned with at least one adjacent modular unit to change the direction of said conduit formed by said plurality of modular units.

18. The utility trenching and sidewalk system of claim 14, further comprising concrete disposed within said cavity of at least one of said modular units.

19. The utility trenching and sidewalk system of claim 14, wherein said cover and said outer sidewalls of each said modular unit define a recess above said cover for receiving paving material, the utility trenching and sidewalk system further comprising paving material disposed within at least one of said recesses.

20. The utility trenching and sidewalk system of claim 14, wherein said modular units are formed from polyethylene.

* * * * *